United States Patent
Pfalz et al.

(10) Patent No.: US 6,800,675 B1
(45) Date of Patent: Oct. 5, 2004

(54) EMULSION POLYMERIZATION METHOD

(75) Inventors: Monika Pfalz, Vienna (AT); Michel Wastyn Marnik, Schwechat (AT); Dietmar Grüll, Langenschönbichl (AT)

(73) Assignee: Südzucker Aktiengesellschaft Mannheim/Ochsenfurt, Mannheim (DE)

(*) Notice: Subject to any disclaimer, the term of this patent is extended or adjusted under 35 U.S.C. 154(b) by 0 days.

(21) Appl. No.: 10/111,055

(22) PCT Filed: Oct. 19, 1999

(86) PCT No.: PCT/AT99/00249
§ 371 (c)(1),
(2), (4) Date: Apr. 17, 2002

(87) PCT Pub. No.: WO01/29091
PCT Pub. Date: Apr. 26, 2001

(51) Int. Cl.[7] .............................. C08L 3/04; C08L 3/12; C08F 2/24; C08F 251/00
(52) U.S. Cl. .............................. 524/47; 524/48; 524/52; 524/53; 524/800; 524/804
(58) Field of Search .............................. 524/47, 48, 52, 524/53, 800, 804

(56) References Cited

U.S. PATENT DOCUMENTS

| | | | |
|---|---|---|---|
| 3,632,535 A | | 1/1972 | Gramera et al. |
| 3,769,248 A | | 10/1973 | Kovats |
| 4,560,724 A | * | 12/1985 | Brabetz et al. ............. 524/734 |
| 4,678,824 A | * | 7/1987 | Lauria ..................... 524/48 |
| 4,940,741 A | | 7/1990 | De Wacker et al. |
| 5,667,848 A | | 9/1997 | Wuestefeld et al. |
| 5,688,845 A | * | 11/1997 | Eden et al. ............... 524/48 |

FOREIGN PATENT DOCUMENTS

| | | |
|---|---|---|
| DE | 39 22 784 A1 | 1/1991 |
| DE | 196 50 790 A1 | 6/1998 |
| EP | 0 021 542 A1 | 1/1981 |
| EP | 0 133 899 A2 | 3/1985 |
| EP | 0 134 449 A2 | 3/1985 |
| EP | 0 134 451 A2 | 3/1985 |
| EP | 0 223 145 A1 | 5/1987 |
| EP | 0 245 718 A2 | 11/1987 |
| EP | 0 257 412 A1 | 3/1988 |
| EP | 0 276 770 A2 | 8/1988 |
| EP | 0 334 515 A1 | 9/1989 |
| EP | 0 536 597 A1 | 4/1993 |
| GB | 2 075 526 A | 11/1981 |
| WO | WO 94/08085 | 4/1994 |
| WO | WP 95/13194 | 5/1995 |
| WO | WO 97/17387 | 5/1997 |
| WO | WO 98/24821 | 6/1998 |

OTHER PUBLICATIONS

Richard F. Tester et al.: "Swelling and Gelatinization of Cereal Starches. I. Effects of Amylopectin, Amylose, and Lipids", *Cereal Chem.*, vol. 67, No. 6, 1990, pp. 551–557.

A.E. McPherson et al.: "Comparison of waxy potato with other root and tuber starches", *Carbohydrate Polymers*, vol. 40, 1999, pp. 57–70.

Tomoko Sasaki et al.: "Effect of Amylose Content on Gelatinization, Retrogradation and Pasting Properties of Starches from Waxy and Nonwaxy Wheat and their F1 Seeds", *Cereal Chemistry*, vol. 77, No. 1, 2000, pp. 58–63.

Saiyavit Varavinit et al.: "Effect of Amylose Content on Gelatinization, Retrogradation and Pasting of Flours from Different Cultivars of Thai Rice", *Starch/Stärke*, vol. 55, 2003, pp. 410–415.

* cited by examiner

*Primary Examiner*—Kelechi C. Egwim
(74) *Attorney, Agent, or Firm*—Laurence A. Greenberg; Werner H. Stemer; Ralph E. Locher

(57) ABSTRACT

The invention relates to starch, derived from amylopectin potatoes, which is preferably in a modified and/or derivatised form. Said starch is an especially advantages protective colloid for use in conducting emulsion polymerization reactions. The invention also relates to emulsion [co] polymerization methods and polymer dispersions produced thereby.

8 Claims, No Drawings

EMULSION POLYMERIZATION METHOD

BACKGROUND OF THE INVENTION

1. Field of the Invention

The invention relates to an emulsion (co)polymerization method in which starch in a preferably modified and/or derivatized form, optionally along with other emulsifiers or auxiliary agents known per se, is used to stabilize the emulsion, and an aqueous polymer dispersion containing such starches and optionally emulsifiers or auxiliary agents known per se.

By emulsion (co)polymerization method (which, for reasons of simplicity, will be referred to as an emulsion polymerization method below), a (co)polymerization method in which liquid monomers are present in an aqueous emulsion and subjected to polymerization in this state is generally understood. Such methods yield aqueous polymer dispersions which are either fed directly to a purpose of use or are subsequently dried to recover the polymers. The monomers, as a rule, are ethylene-unsaturated compounds which are processed to homopolymers or copolymers. Starch primarily functions as a protective colloid, sometimes also as an emulsifier, for the monomers, thus serving as a stabilizer for the monomer emulsions as well as for the polymer dispersions forming.

The basic advantage of the use of starch, modified starch and starch derivatives in industrial processes, in general, and in emulsion polymerization methods, in particular, resides in that starch is a natural raw material renewing every year and available in excess quantities at low cost. Consequently, starch is actually frequently used in technology for various applications.

Other protective colloids usually used in emulsion polymerization methods are partially or completely hydrolyzed polyvinyl alcohols, natural and synthetic rubbers as well as cellulose ethers such as methyl cellulose, hydroxyethyl cellulose, ethylhydroxyethyl cellulose, etc. The fact that these substances tend to precipitate under specific circumstances and, as a result, are no longer able to function as protective colloids speaks against the use of polyvinyl alcohols and cellulose ethers. Moreover, cellulose ethers, polyvinyl alcohols and various rubbers constitute relatively expensive substances, what makes their use again unfavorable.

2. Prior Art

There are various documents that deal with the preparation of polymer dispersions in the presence of starch or starch derivatives as protective colloids:

U.S. Pat. No. 3,632,535 (R. E. Gramera, 1972) describes the use of oxidized starches as protective colloids in the preparation of vinylester polymers proposed for use in paper finishing, textile impregnation, as adhesives or as protective covers.

U.S. Pat. No. 3,769,248 (L. P. Kovats, 1973) describes the use of carboxymethylated starches and hydroxyalkyl starches and, in particular, hydroxypropyl starches alone, and mixtures of hydroxypropyl and hydroxyethyl starches, as stabilizers in the radical polymerization of vinyl acetate.

EP-A1 0 021 542 (P. F. T. Lambrechts, 1981) likewise describes the preparation of aqueous vinyl acetate (co)polymer dispersions in the presence of hydroxypropyl and/or hydroxy-ethyl starches as protective colloids, proposing the use of such dispersions as adhesives and covers or in the color and dye industry.

EP-A2 0 133 899 (H. Brabetz et al., 1985) describes the use of cyanoalkylated, hydroxyalkylated and/or carboxymethylated starches as protective colloids in the polymerization of vinyl esters.

U.S. Pat. No. 4,940,741 (D. R. De Wacker, 1990) describes the production of chip boards by using a polyvinyl acetate emulsion polymerized in the presence of a starch derivative. As vegetable origins, maize, tapioca and waxy maize are mentioned, the starches optionally being octenylsuccinylated, hydroxyproplyated, acidically, enzymatically or oxidatively degraded.

The two applications EP-A0 223 145 (C. P. Iovine et al., 1987) and EP-A2 0 245 718 (J. G. Palmer, 1987) filed by National Starch and Chemical Corporation, respectively, refer to the use of hydrophobed and, in particular, alkenylsuccinylated starches, imidazol-containing starches, cationic starches and acidically or enzymatically degraded starches as protective colloids in the polymerization of emulsions for the preparation of vinyl ester polymers, characterized in that waxy maize and tapioca are cited as preferred vegetable origins.

Another field of application of emulsion polymerization methods in the presence of starches, modified starches or starch derivatives consists in the preparation of polyacryl polymers and copolymers with dextrins and degraded starches being preferred. Chemically not further modified starch degradation products are mentioned in a number of applications by BASF AG (EP-A1 0 536 597; WO 94/08085; WO 97/17387; WO 98/24821), in some cases enzymatic degradation also takes place only immediately prior to polymerization in the same reaction vessel (EP-A2 0 276 770; WO 95/13194; WO 98/24821).

The copolymerization of (meth)acrylonitrile, one or more acrylic acid esters and optionally other ethylene-unsaturated copolymerizable monomers in the presence of oxidatively degraded or cationized, degraded potato starches, as well as the use of hydroxyethyl starches in general, are described in EP-A1 0 257 412 (H. Degen et al., 1988) and EP-A2 0 276 770 (H. Degen et al., 1988). The applications EP-A2 0 134 449 (H. Brabetz et al., 1985), EP-A2 0 134 451 (J. Schulze et al., 1985), DE-A1 39 22 784 (G. Rinck et al., 1991), EP-A1 0 334 515 (R. Kniewske et al., 1989) and EP-A1 0 536 597 (K. Wendel et al., 1993), in which the preparation of aqueous polymer dispersions by the radical aqueous emulsion polymerization of ethylene-unsaturated monomers in the presence of starches, modified starches or starch degradation products are described, should also be mentioned. Every starch form has its own characteristic features differing from those of other forms. To jump to conclusions from one form to another is neither possible nor permissible.

Also EP-A0 257 412 and 0 276 770 describe the emulsion polymerization of monomer mixtures carried out in the presence of degraded starches having viscosities of 0.12 to 0.50 dl/g and from 0.04 to less than 0.12 dl/g, respectively. In doing so, fine-particle aqueous polymer dispersions are obtained, which serve as paper sizing agents. It is pointed out that any native starch may be used, yet without having observed any advantages or disadvantages of specific starches.

SUMMARY OF THE INVENTION

The present invention is based on the surprising finding that amylopectin potato starch both in the native and in the modified or derivatized forms in emulsion polymerization methods is particularly effective as a protective colloid for the stabilization of the emulsion not only in special cases, but in a very general aspect. In this context, it is essential both from a chemical and from an economical point of view that the amylopectin potato starch is one obtained from potatoes inhibited in terms of amylose formation either by cultivation or by recombinant or other molecular-biological methods. These socalled amylopectin potatoes produce starches that constitute pure amylopectin.

Native starches obtained from ordinary potatoes or cereals, as a rule, consist of two different glucose polymers, i.e., about 65 to 85% amylopectin and about 15 to 35% amylose. Amylose and amylopectin are no uniform substances, but mixtures of polymers having different molecular weights. Amylose consists of unbranched or hardly branched alpha-1,4-linked glucose polymer chains, amylopectin constitutes a high-molecular and highly branched polyglucose structure which comprises 1,6-links in addition to the alpha-1,4-links at the branching sites. The commercially most important types of starch like maize starch, potato starch, wheat starch, tapioca starch, rice starch, etc. contain approximately 15 to 30% amylose. Waxy cereals like the waxy mutants of rice, sorghum, rye and, in particular, maize produce starches that consist merely of amylopectin. Waxy maize is by far the most important waxy cereal, yet would not grow particularly well in countries with rougher or cooler climates such as Austria, Germany, Belgium, the Netherlands, Great Britain, Poland, the Scandinavian countries or the Baltic States, their cultivation thus making hardly any economic sense. By contrast, the cultivation of potatoes is substantially more beneficial in those countries and also widely applied for the production of starch. Although methods are known to reduce the amylose content of potato starch by physicochemical procedures, these would involve high expenditures and would be operable only if economic aspects allowed so. From a technical point of view, it is simpler and cheaper to obtain amylopectin from amylopectin potatoes than from conventional potatoes; besides, the amylopectin potato starch obtained from transgenic potatoes presents itself as a more uniform material than the potato amylopectin obtained by the fractionation of ordinary potato starch, having already run through a technically complex method step involving the mechanical and/or chemical strain of the starch. It has, moreover, been feasible in the meantime to recombinantly produce potato varieties which produce an amylopectin that differs from conventional potato amylopectin in terms of branching degree, phosphorus content or molecular mass, from which result properties that differ from those of conventional potato amylopectin, thus offering completely new options of variation in the use of amylopectin potato starches.

It has been surprisingly found that amylopectin potato starch is superior to all other amylopectin starches as regards the ability to function as a protective colloid in emulsion polymerization methods. Unlike starches derived from waxy cereals, amylopectin potato starch has a lower content of lipids and proteins, yet a higher content of phosphate groups, which imparts specific polyelectrolytic properties to the starch. Various problems of smelling and foaming as occur frequently when using waxy cereal starches or derivatives thereof are observed not at all or only rarely and to a slighter extent when using potato starch or amylopectin potato starch. On account of its high purity, amylopectin potato starch does not require any further purification steps if used as a protective colloid for emulsion polymerization procedures. Waxy maize starch, for instance, should be degreased and desalinated by washing prior to its use as a protective colloid in emulsion polymerization procedures in order for the beneficial properties typical of hydrocolloids to fully evolve. This step may be obviated with amylopectin potato starch, thereby reducing procedural costs.

One of the reasons why starches, modified starches and starch derivatives still do not represent the protective colloids most frequently used in emulsion polymerization is certainly due to the fact that most of the conventional starches tend to retrogradation in the pasty form. This means that such pastes will thicken in the course of time and gelatinize subsequently, thus becoming useless. Retrogradation is primarily caused by the amylose contained in most starch types gradually aggregating in a crystalline form. In amylopectin starches retrogradation phenomena do not occur to the same extent as in amylose-containing starches, yet they will still appear more or less intensely as a function of the vegetal origin. Thus, it has been shown in a surprising manner that amylopectin potato starch is hardly prone to retrogradation, the latter even being negligible, whereas waxy maize starch exhibits a clearly higher tendency to retrogradation. Consequently, when carrying out emulsion polymerization procedures in the presence of starches, modified starches and starch derivatives originating from amylopectin potatoes, no undesired thickening of the reaction mixture caused by retrogradation will occur, which might otherwise lead to coagulation and render the aqueous polymer dispersion useless. In view of waxy maize starch, amylopectin potato starch stands out for its particularly high stability against retrogradation as well as its higher purity, as already indicated above.

Amylopectin potato starch may be present either in the native, non-modified form or in a form modified by physical and/or chemical measures. Starches that are soluble, or at least swellable, in water have proved to be particularly beneficial. Water-soluble starches or starches capable of swelling in water may be obtained by decomposition procedures such as cooking in aqueous media, pressure-treatment, heat-treatment or by exerting mechanical strain on native starches or by chemical degradation through hydrolysis and, in particular, acidically catalyzed hydrolysis, enzymatically catalyzed hydrolysis, oxidative or alkaline treatment. Such degradation products are also referred to as maltodextrins, white and yellow dextrins, roasted dextrins, British gums, oxidized starches, etc., generally also as starch degradation products, dextrins or saccharified starches.

According to the invention, also chemically modified and/or derivatized starches are preferred, i.e., starch derivatives in which the hydroxy groups of the glucose moieties are partially present in etherified or esterified forms. Chemical modification may be realized both on the native amylopectin potato starch and on its degradation products. Similarly, it is also feasible to convert chemically modified starches into their chemically modified degradation products only afterwards.

The esterification of starch may be realized both with inorganic and with organic acids their anhydrides or halogenides and, in particular, chlorides. Usual esterified starches are phosphated and/or acetylated starches or starch degradation products.

The etherification of the hydroxy groups may be effected, for instance, with organic halogen compounds, epoxides or sulfates in aqueous alkaline solutions. Examples of suitable ethers are alkyl ether, hydroxyalkyl ether and, in particular, hydroxyethyl ether and hydroxypropyl ether and, furthermore, carboxyalkyl ether, cyanoalkyl ether, allyl ether and cationically modified ethers such as, e.g., (trisalkylammonium)alkyl ether and (trisalkylammonium) hydroxy-alkyl ether. Depending on the type of chemical modification, the starches or starch degradation products may be neutral, cationic, anionic, amphoteric or amphiphilic.

The starches and starch degradation products may also be hydrophobed or cross-linked through suitable derivatization procedures. By hydrophobed starches, starch ethers, fatty acid starch esters or starch semi-esters whose ether, ester or semi-ester substituents contain a saturated or unsaturated hydrocarbon chain comprising at least four hydrocarbons, which may be branched or unbranched are usually understood. Of particular interest are semi-ester derivatives obtained by the reaction of starch or starch degradation products with an alk(ene)-substituted cyclic anhydride such as succinic acid anhydride, glutaric acid anhydride, maleic acid anhydride or phthalic acid anhydride, and, in particular, alkenylsuccinylated starches or starch degradation products. Cross-linked starches are mostly obtained by reaction with epichlorohydrin, mixed anhydrides of monocarbonic acids with di- or tribasic acids (e.g., mixed anhydride of acetic acid and adipinic acid), sodium trimetaphosphate, phosphorus oxychloride or aldehydes. These starches are then called epi-cross-linked, adipate-cross-linked, phosphate-crosslinked or acetalically cross-linked, respectively. Crosslinking imparts new favorable properties to starches or starch degradation products.

The use of chemically not further derivatized starch degradation products of amylopectin potato starch, which are obtained by acidically catalyzed hydrolysis, enzymatically catalyzed hydrolysis, oxidative or alkaline treatment, i.e., the use of maltodextrins, white and yellow dextrins, roasted dextrins, British gums, etc., or of oxidized starches and starch degradation products has proved to be particularly advantageous. When preparing degradation products from amylopectin potato starch it has been shown that reaction yields are altogether higher than with conventional potato starch degradation products, this resulting in more favorable production costs. Due to the small loss of soluble starch, the load on the environment is, moreover, reduced by the sewage disposal plants on the production sites being less strongly loaded than hitherto, which leads again to more favorable production costs. Furthermore, it has turned out to be beneficial to carry out the respective degradation reactions on the amylopectin potato starch only immediately before the emulsion polymerization reaction step and in the same reaction vessel. This method variant is also referred to as "one-pot reaction". In this manner, additional processing and purification steps may be obviated and the overall reaction and method times are shortened, which helps again save costs.

The starches, modified starches and starch derivatives used according to the invention in an emulsion polymerization, on the one hand, may be used as protective colloids in combination with emulsifiers and, on the other hand, can assume the function of emulsifiers also themselves. This is sought in many cases, because large amounts of emulsifiers contained in a polymerization mixture involve frequent problems such as flocculation, a lack of mechanical stability, coagulation or excessive foaming. This is due to the fact that the emulsion polymerization process not only causes the formation of polymer latex from the monomers, but that various additives and auxiliary substances are physically or chemically incorporated into this latex to some degree from the reaction mixture. Excess amounts of conventional emulsifiers have adverse effects, yet by contrast, if a starch, modified starch or starch derivative that functions as a protective colloid in a polymerization mixture is incorporated into the polymer latex, the physical properties of the polymer latex may even be improved due to an enhanced mechanical stability. The chemical incorporation of the starches, modified starches or starch derivatives functioning as protective colloids into the polymer latex is called grafting, and this cannot be completely eliminated. Too intense a grafting reaction will cause the flocculation and coagulation of the latex, whereas, when occurring moderately, this will improve the mechanical properties of the resulting latex, as already pointed out above.

The emulsion polymerization method according to the invention is carried out in the manner of a radical polymerization in an aqueous medium, preferably water, in the presence of amylopectin potato starch or its modification products or derivatives. Suitable monomers for polymerization contain at least one ethylene-unsaturated bond like vinyl esters and ethers, styrenes, acrylates and methacrylates. In general, any ethylene-unsaturated monomer, which may also be cyclic, may be employed in a radical emulsion polymerization process. Examples of suitable monomers comprise vinyl esters, vinyl ethers, vinyl and vinylidene halides, vinylsulfonic acid, N-vinylpyrrolidone, ethylene, alphaolefins, vinylaromatic monomers, allylamines, allyl ethers, allyl esters, allyl amides, dienes, (meth)acrylonitrile, (meth) acrylic acid and its esters, hydroxyalkyl(meth)acrylates, (meth)acrylamides as well as esters and anhydrides of crotonic, maleic, fumaric and itaconic acids. Suitable vinyl esters are aliphatic vinyl esters such as vinyl formate, vinyl acetate, vinyl propionate, vinyl-n-butyrate, vinyl isobutyrate, vinyl-t-butyrate, vinyl pentanoate, vinyl hexanoate, vinyl laurate, vinyl stearate, etc. Typical representatives of acrylates and methacrylates comprise methyl (meth)acrylate, ethyl (meth)acrylate, n-butyl (meth)acrylate, isobutyl (meth)acrylate, t-butyl (meth)acrylate, neopentyl (meth)acrylate, n-hexyl (meth)acrylate, cyclohexyl (meth) acrylate, 2-ethylhexyl (meth)acrylate, stearyl (meth) acrylate, palmityl (meth)acrylate. Typical vinyl ethers are methyl vinyl ether, ethyl vinyl ether, n-propyl vinyl ether, isopropyl vinyl ether, n-butyl vinyl ether, isobutyl vinyl ether or 2-ethylhexyl vinyl ether. The group of alpha-olefins includes propylene, 1-butene, isobutene,1-pentene, cyclopentene, 1-hexene, cyclohexene or 1-decene. The group of vinylaromatic monomers includes styrene, alphamethyl styrene, 2-, 3- or 4-methyl styrene, 2-, 3- or 4-methoxystyrene, 1- and/or 2-vinyl naphthalene or o-chlorostyrene. Allyl amine and N-substituted allyl amine are examples of typical allyl amines, typical allyl ethers comprising methyl, ethyl, n-propyl, iso-propyl, n-butyl, isobutyl and 2-ethylhexyl allyl ethers. Allyl esters derived from saturated monocarbonic acids, such as allyl acetate, allyl propionate or allyl acetate, are suitable as well. Suitable dienes are butadiene, cyclopentadiene, dicyclopentadiene, isoprene, phenyl butadiene or chloroprene. The polymers maybe prepared from one or several ethylene-unsaturated monomers, the term "polymer" comprising both homopolymers and copolymers obtained from two or more different monomers.

Further polymer modification results from the polymerization of basic compounds such as N,N'-dialkylaminoalkyl (meth)acrylate (e.g., dimethylaminoethylmethacrylate, dimethylaminoethylacrylate, diethylaminoethylacrylate), N,N'-dialkylamino-alkyl(meth)acrylamide (e.g., methacrylamidopropyldimethylamine) and N-vinylimidazolium compounds (e.g. N-vinylimidazole, 2-methyl-N-vinylimidazole, N-vinylimidazoline, 2-methyl-N-vinylimidazoline) in the form of the free base, of salts of organic or inorganic acids or in quaternary form. Salt formation is suitably carried out with carbonic acids containing 1 to 7 hydrocarbons, such as formic acid, acetic acid, propionic acid, benzenesulfonic acid, p-toluenesulfonic acid, or inorganic acids such as sulfuric acid or hydrohalic acids, for instance, hydrochloric acid or hydrobromic acid. Alkyl halogenides such as methyl chloride, ethyl chloride or benzyl chloride and dialkyl sulfates such as diethyl sulfate and dimethyl sulfate are suitable quaternizing agents. In addition, the polymers may be modified by the polymerization of cross-linking or cross-linkable monomers aimed to increase strength. Cross-linkable monomers are polyfunctional monomers which, in addition to the ethylene-unsaturated bond, also contain an epoxy, hydroxy, n-alkylol or carbonyl group. Examples include the N-hydroxyalkyl amides and N-alkylol amides of the ethylene-unsaturated carbonic acids mentioned, for instance, 2-hydroxyethyl (meth)acrylamide and N-methylol(meth)acrylamide. By cross-linking compounds, those compounds are understood which comprise two or more non-conjugated ethylene-unsaturated bonds such as the vinyl or allyl esters of ethylene-unsaturated carbonic acids, e.g., vinyl and allyl (meth)acrylates, divinyl aromatics like divinyl benzene and divinyl naphthalene, or polyvinyl esters or polyallyl esters of polycarbonic acids. Such monomers, as a rule, are introduced by polymerization only in minor quantities, based on the total amount of monomers to be polymerized.

The emulsion polymerization may be carried out in a temperature range of between 20° C. and 120° C., usually between 30° C. and 95° C., and is initiated by a suitable radical polymerization initiator. Radical polymerization initiators encompass all those which are able to trigger a radical aqueous emulsion polymerization process. These include peroxides like hydrogen peroxide or alkali metal peroxodisulfates like potassium, sodium or ammonium peroxodisulfates, peracids like peracetic acid, organic peroxides like benzoyl peroxide or t-butyl hydroperoxide, azo-compounds like azabisisobutyronitrile, or in some cases also perborates. Combined systems composed of at least one organic reductant and at least one peroxide and/or hydroperoxide, such as, e.g., t-butyl hydroperoxide and the sodium salt of hydroxymethane sulfinic acid or hydrogen peroxide with ascorbic acid are also suited. Furthermore, combined systems which additionally contain slight amounts of a metal compound that is soluble in the polymerization medium and whose metal component may occur in several valence stages, such as, e.g., ascorbic acid/iron(II) sulfate/hydrogen peroxide may also be used, it being frequently feasible to replace ascorbic acid with the sodium salt of hydroxymethane sulfinic acid, sodium sulfite, sodium hydrogensulfite or sodium bisulfite, and the hydrogen peroxide with t-butylperoxide or alkali metal peroxodisulfates and/or ammonium peroxodisulfate. In combined systems it is, furthermore, suitable to use the saccharified starches as reducing components. As a rule, the amount of radical initiator systems employed is 0.1 to 2% by weight, based on the total amount of monomers to be polymerized. The emulsion polymerization may optionally be carried out in the presence of polymerization regulators to control the molecular weight of the polymers. Suitable molecular weight regulators are, for instance, alcohols like isopropanol and sulfur-containing regulators like t-butylmercaptan, mercaptoacetic acid, mercaptopropionic acid and dodecyl mercaptan.

The emulsion polymerization method according to the invention may be carried out as a batch method or a semi-batch method, but also in a continuous or semi-continuous manner. During polymerization, good blending of the components is to be ensured. The reaction mixture is, thus, stirred during the whole polymerization period and an optionally subsequent post-polymerization step aimed to lower the residual monomer content. Polymerization is carried out under the exclusion of oxygen in an inert gas atmosphere, for instance, under nitrogen. To start polymerization, oxygen is initially eliminated from the aqueous starch solution as well as from the monomers and a portion of the monomers to be polymerized is, at first, added to the aqueous starch solution and emulsified therein by stirring of the reaction mixture. Polymerization will start upon the previous, simultaneous or subsequent addition of an aqueous initiator solution—usually after a short induction period. The polymerization heat forming at the onset of polymerization may be used to heat the reaction mixture. The temperature may rise to 90° C. As soon as the charged monomers have been polymerized, the remaining monomers and initiator solution are added continuously or in batches and polymerized under stirring. Monomer dosing may, however, also be effected continuously from the start of polymerization. A fine-particle aqueous dispersion in which the copolymer particles are surrounded by a protective colloid envelope based on amylopectin potato starch is obtained. It goes without saying that the radical aqueous emulsion polymerization according to the invention may also take place under an elevated or reduced pressure. The dispersions obtained offer additional beneficial properties typical of amylopectin potato starch. Due to the virtually absent retrogradation as pointed out above, dispersions that are stable in storage over extended periods of time are obtained. Moreover, amylopectin potato starch derivatives generally have an emulsion-stabilizing effect substantially improved over comparable waxy maize starch derivatives, which results in enhanced viscosity stabilities and reduced or even nonexistent segregations or phase separations also in the polymer dispersions prepared according to the invention. This is, furthermore, due to a more uniform droplet distribution within the dispersion.

On the one hand, the optionally modified or derivatized amylopectin potato starches used according to the invention are suitable as sole dispersants in the realization of an emulsion polymerization process and, on the other hand, further surface-active substances may be present in the reaction mixture. In principle, the protective colloids and emulsifiers usually employed as dispersants, such as copolymers containing polyvinyl alcohols, cellulose derivatives, vinylpyrrolidone, or synthetic and natural rubbers may be considered as accompanying surface-active substances. Even mixtures of emulsifiers and/or protective colloids may be used. Anionic, cationic and nonionic emulsifiers may be employed as accompanying emulsifiers. If mixtures of surface-active substances are used, the individual components must be compatible with one another, what may be verified by few preliminary tests in case of doubt. Useful nonionic emulsifiers are, for instance, ethoxylated fatty alcohols (EO degree: 3 to 50, alkyl residue: $C_8$–$C_{36}$), ethoxylated mono-, di- and trialkyl phenols (EO degree: 3 to 50, alkyl residue: $C_4$–$C_{10}$) as well as polyethylene oxide/polypropylene oxide block copolymers. Suitable anionic emulsifiers comprise alkali metal salts of sulfosuccinic acid dialkyl esters as well as alkali salts and ammonium salts of alkyl sulfates (alkyl residue: $C_8$–$C_{22}$), of sulfuric acid semi-esters of ethoxylated alkanols (EO degree: 2 to 50, alkyl residue: $C_{12}$–$C_{18}$) and ethoxylated alkyl phenols (EO degree: 3 to 50, alkyl residue: $C_4$–$C_9$), of alkylsulfonic acids (alkyl residue: $C_{12}$–$C_{18}$) and of alkylarylsulfonic acids (alkyl residue: $C_9$–$C_{18}$). Cationic emulsifiers preferably comprise quaternary ammonium halogenides such as, for instance, trimethylcetylammonium chloride, methyltrioctylammonium chloride, benzyltriethylammonium chloride or quaternary compounds of N-($C_6$–$C_{20}$)alkyl pyridines, N-($C_6$–$C_{20}$)alkyl morpholines or N-($C_6$–$C_{20}$)alkyl imidazolines such as N-laurylpyridinium chloride. As already mentioned, emulsion polymerization procedures may be carried out also without the emulsifiers or protective colloids cited herein, if the starches, modified starches and starch derivates according to the invention are used and, in particular, if cationic, anionic, amphoteric or also amphiphilic starches or starch degradation products which, at the same time, also function as emulsifiers or protective colloids, are employed.

The polymer dispersions obtained according to the invention are suitable for use in the paper, adhesive, color and dye, textile and construction material industries. Thus, they may, for instance, be applied as adhesives, binders for carpet back coatings as well as coating slurries for paper, as additives for mineral, e.g. hydraulically setting, masses, as sizing agents for fibers, as binders for fine-particle mineral and/or organic materials for the production of shaped articles, in particular for metal casting, or paints and as binders or thickening agents for the production of grinding agents based on fine grinding particles bound to one another and/or a carrier. On account of their enhanced mechanical stability, these polymer dispersions are also suitable for the production of coatings to coat and/or embed, in particular, pharmaceutically active substances for oral administration.

It is also feasible to convert the polymer dispersions obtained, generally without additional auxiliary agent by spray-drying or drum drying, into redispersible polymer powders whose redispersibility will be preserved even after extended storage times.

EXAMPLE 215 g oxidatively degraded amylopectin potato starch are introduced into 500 g water, heated to 85° C. under nitrogen atmosphere and mixed with alpha-amylase (0.07%, based on dry substance starch). The temperature is raised until boiling under constant stirring, and the starch is enzymatically degraded for 10 minutes. The inactivation of the enzyme is effected by the addition of glacial acetic acid, then cooling to 85° C. takes place and 7 g of a 1% iron-II-sulfate solution as well as 0.7 g 30% hydrogen peroxide are added. Within 2.5 hours, a monomer mixture of 312 g n-butyl acrylate, 281 g styrene and 31.2 g methacrylic acid is pre-emulsified by the aid of 0.6 g Na-dodecylsulfonate in 255 g water, dosed in continuously, at the same time an initiator solution of 4 g 30% hydrogen peroxide in 50 ml water is continuously supplied over a period of 3 hours. After this, post-polymerization at 85° C. for one hour cooling to room temperature are effected. The result is readily stirrable polymer dispersion stable in storage and having a solids content of about 50%.

We claim:

1. An aqueous polymer dispersion made by a process which comprises:

obtaining a starch including amylopectin potato starch from potatoes while inhibiting amylose formation;

(co)polymerizing an emulsion; and stabilizing the emulsion with the starch.

2. The aqueous polymer dispersion according to claim 1, wherein the method further comprises modifying the starch.

3. The aqueous polymer dispersion according to claim 1, wherein the method comprises inhibiting the amylose formation by a cultivation method.

4. The aqueous polymer dispersion according to claim 1, wherein the method comprises inhibiting the amylose formation by a recombinant method.

5. The aqueous polymer dispersion according to claim 1, wherein the method comprises inhibiting the amylose formation by a molecular-biological method.

6. The aqueous polymer dispersion according to claim 1, wherein the method further comprises adding a further emulsifier during the (co)polymerizing.

7. The aqueous polymer dispersion according to claim 1, wherein the method further comprises stabilizing the (co) polymerizing with an emulsion stabilizer.

8. The aqueous polymer dispersion according to claim 2, herein the method further comprises derivating the starch.

* * * * *